US 7,676,246 B2

(12) United States Patent
Kreiter

(10) Patent No.: US 7,676,246 B2
(45) Date of Patent: Mar. 9, 2010

(54) SECURE AUDIO-VISUAL COMMUNICATION DEVICE

(76) Inventor: Marcus Kreiter, No. 191, 2549 Eastbluff Dr., Newport Beach, CA (US) 92660

( * ) Notice: Subject to any disclaimer, the term of this patent is extended or adjusted under 35 U.S.C. 154(b) by 545 days.

(21) Appl. No.: 11/406,960

(22) Filed: Apr. 18, 2006

(65) Prior Publication Data

US 2007/0242130 A1 Oct. 18, 2007

(51) Int. Cl.
*H04M 1/00* (2006.01)
(52) U.S. Cl. .............. 455/556.2; 455/556.1; 455/550.1; 455/566; 370/338
(58) Field of Classification Search .............. 455/550.1, 455/556.1, 556.2, 566; 370/338
See application file for complete search history.

(56) References Cited

U.S. PATENT DOCUMENTS

| 6,763,226 | B1 * | 7/2004 | McZeal, Jr. ................. 455/90.2 |
| 2004/0192259 | A1 * | 9/2004 | Xie .......................... 455/412.1 |
| 2005/0088981 | A1 * | 4/2005 | Woodruff et al. ........... 370/260 |
| 2005/0250534 | A1 * | 11/2005 | Maurer .................... 455/556.1 |
| 2006/0077996 | A1 * | 4/2006 | Lee ............................ 370/441 |
| 2007/0153752 | A1 * | 7/2007 | Donnellan .................. 370/338 |
| 2007/0173231 | A1 * | 7/2007 | Fadell ...................... 455/412.1 |
| 2007/0242424 | A1 * | 10/2007 | Lieu et al. .................... 361/686 |

* cited by examiner

*Primary Examiner*—Rafael Pérez-Gutiérrez
*Assistant Examiner*—Liton Miah
(74) *Attorney, Agent, or Firm*—Curtis L. Harrington; Kathy E. Harrington; Harrington & Harrington

(57) ABSTRACT

A method and apparatus are disclosed for providing audio-visual communication between registered users. Similar to the traditional walkie-talkie, a user depresses a button to transmit audio information, such as voice, and releases the same button to receive audio information from a transmitting device. Additionally, when communicating to another unit, the transmitting unit can also simultaneously send streaming video or still pictures in conjunction with audio communication. Both the audio and streaming video are transmitted and received in real-time. Still pictures may be stored or transmitted at any time. Each unit comprises a transmitter, antenna, camera, speaker, display screen and battery that are compact enough to be taken anywhere and allow for mobility. To enable security of the device, users must register with each other while within range before any communication can begin. This invention will allow users to communicate with each other for both business and recreational purposes.

2 Claims, 12 Drawing Sheets

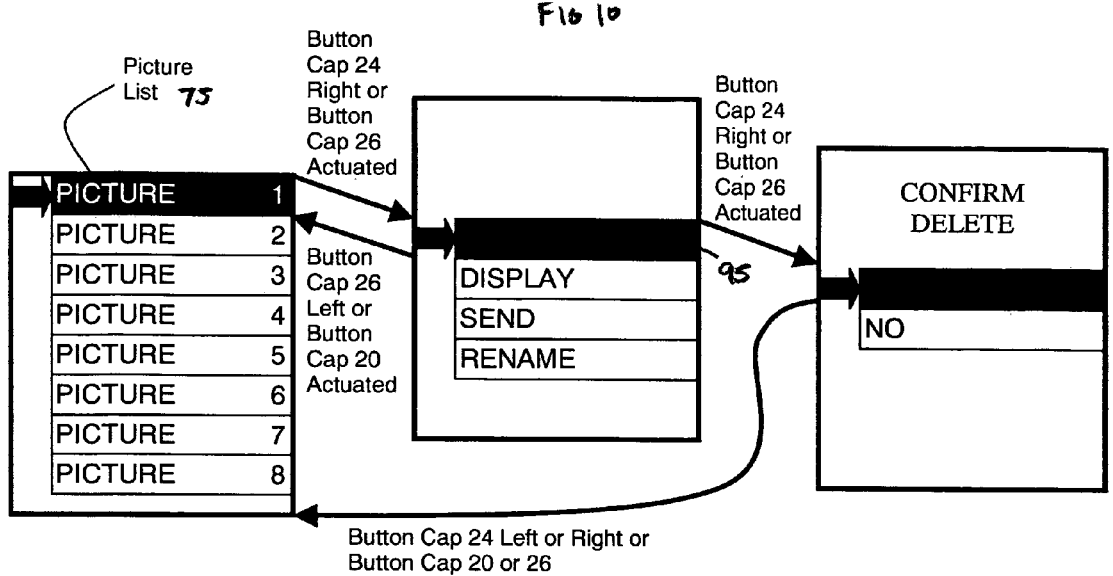
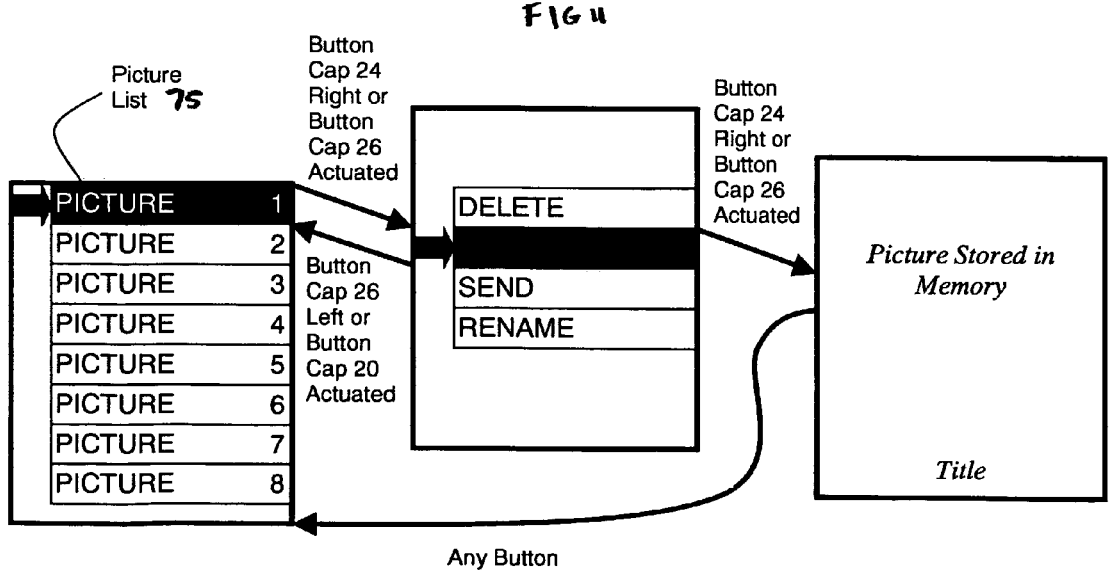

SECURE AUDIO-VISUAL COMMUNICATION DEVICE

FIELD OF INVENTION

The present invention relates to the field of wireless communication. More specifically, the invention relates to the technical field of secure, mobile, audio-visual communication.

BACKGROUND OF THE INVENTION

In today's high-tech age of communication, with radiofrequency ("RF") and WiFi enabled personal digital assistants ("PDAs"), cellular telephones that play media clips while sending pictures, and RF-internet teleconferencing, the selection of a mobile device proves complex for consumers and competition remains high among electronic device manufacturers. Consumers have many different options between products and sometimes must buy more than one device for many distinct situations. Manufacturers and retailers must try to fit as much technology as possible into each device in order to meet this consumer need.

Although wirelessly-enabled PDAs, data tablets, laptops and even some handheld wireless game consoles can provide a visual capability for the user, they are inherently and extremely limited in range and are therefore not effectively mobile. In the case of internet enabled PDA's or mobile teleconferencing terminals, these devices require an expensive hub that severely limits the range between the hub and terminal on both ends, require an expensive routing computer on both ends, as well as, an internet connection with paid service. Similarly, WiFi enabled devices require an expensive hub and also greatly limit the range of connected devices. In all cases, these devices require substantial technical skill for installation and setup and sometimes even for operation.

This class of mobile device comes complete with power limitations. They typically run on small batteries and usually communicate under protocols defined in subparts of the general 802.11 specifications. These specifications describe full duplex protocols that require the transmitters to be on at all times. High power levels cannot be maintained without the operating time becoming drastically reduced. These power problem cause further limitations among wireless devices.

To date, even cell phones cannot send real-time video that is derived from the camera of the caller. Their use depends upon paid network service and equipped public infrastructure. Hence, cell phones become useless in rural or country areas having poor or nonexistent coverage. They are also useless when the public infrastructure is down for various reasons, possibly including disaster. In addition, the operation of cell phone functionality is often complex.

Walkie-talkies hold a special niche in the cluster of communication options and are singularly the most appropriate device in many widely understood situations. They are free and simple to use and are commonplace for both commercial and personal use. However, unlike cellular telephones they lack the ability to send still pictures and streaming video, send secure communication or provide group registration. In many situations where a walkie-talkie is the most appropriate device, users opt to use a less appropriate device such as a cell phone because of its ability to send pictures. The present invention attempts to solve these current problems by providing service that is free, and a device that is capable of transmitting long distance while being very easy to use right out of the box.

SUMMARY OF THE INVENTION

It is for the foregoing reasons that the purpose of the present invention is to simplify the complexities of today's communication world by extending the abilities of the walkie-talkie beyond that of today's expensive, and in the case of cell phones, real-time video-limited devices. Aside from the natural desire of users to want to communicate with each other as if the recipient was virtually present, the disclosed invention gives users numerous benefits not yet achieved for this class of device. These benefits range in diversity from allowing facility maintenance workers to send visual clarification of problems and fixes, to allowing lost children to visually transmit nearby landmarks to frantic parents and receive instructions or directions. As the old idiom goes, a picture is worth a thousand words and thus, by logical extension, video can only be worth more. All of these benefits are achieved securely and simply using the present invention. To achieve these results, the present invention provides the two basic sensory stimuli of sight and sound over the well-accepted use model of the walkie-talkie. Moreover, it is capable of providing these sensations simultaneously and securely. Not only does it provide a more true-to-life effect, but also drastically improves the overall communication of information.

The present invention operates on its own proprietary simplex protocol and only transmits when a user is talking; transmitting audio information, visual information or both. This utilizes a low duty cycle model. Hence, longer ranges can be achieved through the use of higher transmit power with drastically reduced average power draw from the unit.

The present invention sends real-time video and works in any geographic area on the globe, whether or not in time of disaster. The free and independent nature of this infrastructure has and will keep walkie-talkies a vital means of communication in any time. Their only downfall in the ever-advancing world of communication has been their lack of secure communication and ability to send picture or video. The present invention overcomes the drawbacks of the walkie-talkie by adding a camera, registration capability and its proprietary digital protocol.

These and other objectives of the claimed invention will no doubt become obvious to those of ordinary skill in the art after reading the following detailed description of the preferred embodiment that is illustrated in the various figures and drawings.

BRIEF DESCRIPTION OF THE DRAWINGS

FIG. 10 illustrates a preferred embodiment of the best method of deleting still pictures.

FIG. 11 illustrates a preferred embodiment of the best method of displaying still pictures.

DETAILED DESCRIPTION OF THE PREFERRED EMBODIMENT

In the following description of the various embodiments, reference is made to the accompanying drawings, which form a part hereof, and in which is shown by way of illustration various embodiments in which the invention may be practiced. It is to be understood that other embodiments may still be utilized and structural and functional modifications may be made without departing from the scope and spirit of the present invention.

Figure 1:
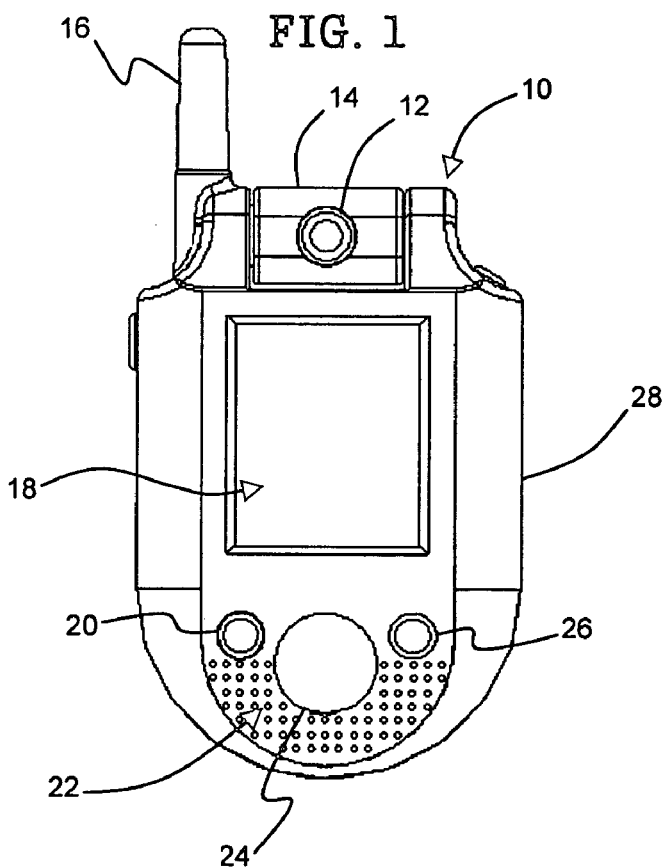
FIG. 1 illustrates a front view of a preferred embodiment of the present invention.

Referring to FIG. 1, a preferred embodiment of device 10 is shown. Device 10 includes a body structure 28 for housing all of the functional electrical elements shown in FIG. 5 and all associated mechanical and electrical mountings and interconnects. Antenna cap 16 is a mechanical cover of flexible plastic or durable rubber that is chemically bonded to device 10. Internal antenna 60, within antenna cap 16, is a helically wound wire, matched to resonate at the base operating radio carrier frequency of device 10 and is electrically connected to radio frequency switch 58 to allow device 10 to send and receive data, which is either video and voice signals, JPEG format pictures and voice signals, or just voice signals as radio frequency signals.

As best shown in FIGS. 1-4, are a combination of external features located on body structure 28. LCD screen 16 is a protective transparent layer covering the active display area of LCD module 56. LCD module 56 contains LCD control circuitry along with sufficient memory to store a full-screen image, the LCD glass and power control. LCD module 56 is an off-the-shelf single unit bought from a single vendor.

User button cap 20 is used to call up and extinguish an on-screen menu displayed on LCD screen 16 and is mechanically connected such that it actuates a singularly specific one of the eight user buttons 50. A four-way axis, up, down, right and left-actuated user button cap 24 is used for manipulating the on-screen menu-selection cursor and is mechanically connected such that it individually actuates four of the eight user buttons 50 one at a time. User button cap 26 is used for on-screen menu selection and is also used to power device 10 on and off, by pushing it briefly to transition device 10 from "off" mode to "on" mode, and by depressing it for more than three seconds to transition device 10 from "on" mode to "off" mode. User button cap 26 is mechanically connected such that it actuates a singularly specific one of the eight user buttons 50.

Figures 2, 3:
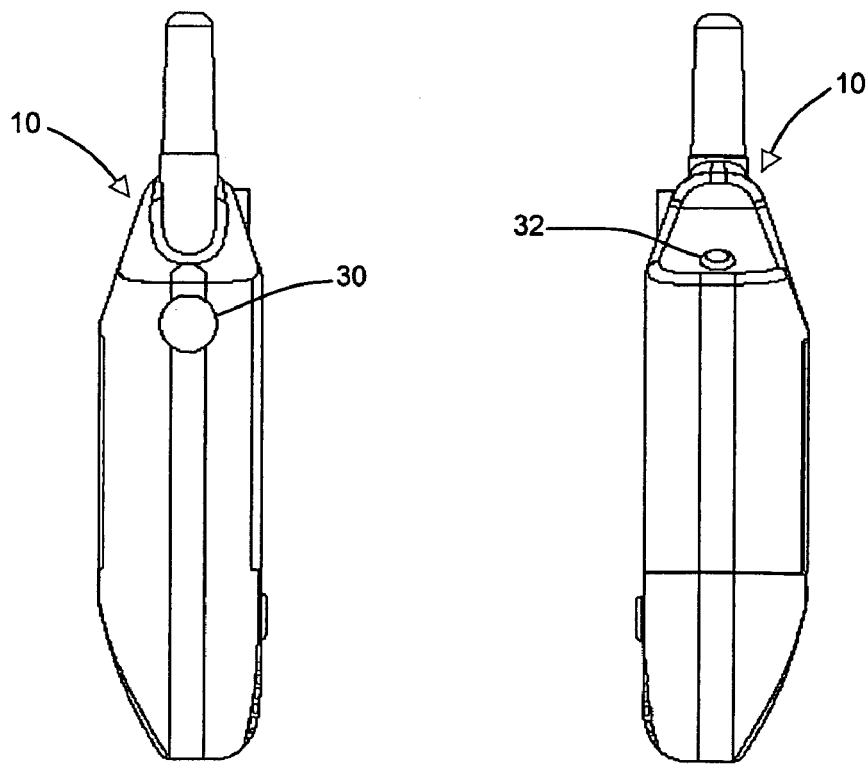
FIG. 2 illustrates a side view of the left side of the embodiment shown in FIG. 1.
FIG. 3 illustrates a side view of the right side of the embodiment shown in FIG. 1.

As best shown in FIG. 2, user button cap 30 is used to select between transmit and receive functions of device 10. When user button cap 30 is actuated, transmission of data is enabled and active. Data is transmitted through antenna 60. When user button cap 30 is not actuated device 10 is in "receive" mode and will receive data from another device 10 that is registered to it. User button cap 30 is mechanically connected such that it actuates a singularly specific one of the eight user buttons 50.

As best shown in FIG. 3, user button cap 32 is used to take snap shot pictures of visual information that is within the visual field of CMOS image sensor 68, send that information to digital signal processor ("DSP") 40 for JPEG compression and store that compressed JPEG format information as a picture within the flash memory 41 of DSP 40. The JPEG format picture stored in flash memory 41 can be viewed on LCD screen 16 or transmitted to another device 10. Control of picture display, transmit and management of JPEG format pictures is achieved with on-screen menu selections displayed by LCD module 56 which is controlled and manipulated by user button caps 20, 24 and 26. JPEG format pictures can also be received from another device 10 and stored in flash memory 41 and manipulated in the same manner as a JPEG format picture that was generated locally on device 10. User button caps 20, 24 and 26 also are used to control and manipulate the on-screen menu to disable and re-enable video. Upon power up, the default condition will always be video transmission enabled so the on-screen menu will have to be accessed to disable it. When the on-screen menu is not displayed, pressing user button cap 24 up or down will respectively increase the audio volume generated by speaker 46 up or down. When user button cap 30 is actuated, transmission of data is enabled and active through antenna 60. When user button cap 30 is not actuated, device 10 is in "receive" mode and will receive any data transmitted to it. User button cap 30 is mechanically connected such that it actuates a singularly specific one of the eight user buttons 50.

Again referring to FIGS. 1-4, perforated grill plate 22 covers and provides protection for speaker 46. Speaker 46 emits the audio portion of data received by device 10. In "receive" mode, data is received through antenna 60. In "receive" mode, radio frequency switch 58 connects the radio frequency data to the receive port on the radio frequency transceiver chip 66. The radio frequency transceiver chip 66 then down converts the data to base band and demodulates it in to a digital data stream. This digital data stream is input to DSP 40 and checked to make sure it is a stream from a registered device 10. If the stream is not recognized from a registered user, it is ignored. If a stream is recognized as from a registered device 10, then the data is decompressed by DSP 40. The compression used for both transmit and receive adheres to the ISO H.264 standard. The H.264 data stream is then parsed by data type. Audio data type is converted from digital format to an analog signal by an integrated digital to analog converter on DSP 40. This analog signal is then filtered and amplified by audio driver circuit 48 and played in real-time on speaker 46. Volume control of this amplified signal is achieved by reducing the dynamic range of the digital to analog converter on DSP 40. Video data type is displayed real-time on LCD screen 16. When the received signal is terminated, the last received frame of video will persist on LCD screen 16 until another stream is received or until device 10 is powered down. Decompressed data type JPEG pictures are displayed immediately on LCD screen 16 and display of any received video data type is suspended until user button cap 32 is pressed or the image is stored in flash memory 41 located in DSP 40. Storage of a JPEG picture in DSP 40 flash memory 41 is done through the on-screen menu. Display of data type video is resumed once the image is stored.

Perforated grill plate 22 covers and provides protection for microphone 42 as well as speaker 46. When button cap 30 is actuated no further reception of any present data stream is allowed. Single chip transceiver 66 switches into "transmit" mode, radio frequency switch 58 disconnects antenna 60 from the receive port on single chip transceiver 66 and connects antenna 60 to the output of radio frequency power amplifier 62. Audible signals in the ambient environment detectable by microphone 42 are filtered and amplified by microphone filter and preamp 44. This analog signal is input to an analog to digital converter on DSP 40 and compressed in ISO H.264 format. If the default transmit video function is enabled, visual information within the visual field of CMOS image sensor 68 is also compressed in H.264 format and added to the outgoing data stream. If a JPEG picture has been sent, it is specially tagged and added to the data stream. This tag will inform the receiving device 10 to treat that frame as a picture and not a video frame. The completed data stream is then input to the single chip transceiver 66 where it is modulated and up converted to the carrier frequency of device 10. This signal is then filtered by radio frequency harmonics filter 64 and input into radio frequency power amplifier 62. The amplified radio signal from radio frequency amplifier 62 is passed through radio frequency switch 58 and radiated out of antenna 60.

Visual information detected by CMOS image sensor 68 is optically focused onto the active area of CMOS image sensor 68 by lens assembly 12. Lens assembly 12 is attached to body structure 14 through a threaded hole that allows for focus adjustment during manufacturing and allows the user to make adjustments if optical alignment is lost over time due to mechanical stresses. Body structure 14 is independent from body structure 28 and can swivel up to 210 degrees around an axis parallel to screen 16.

Figure 4:
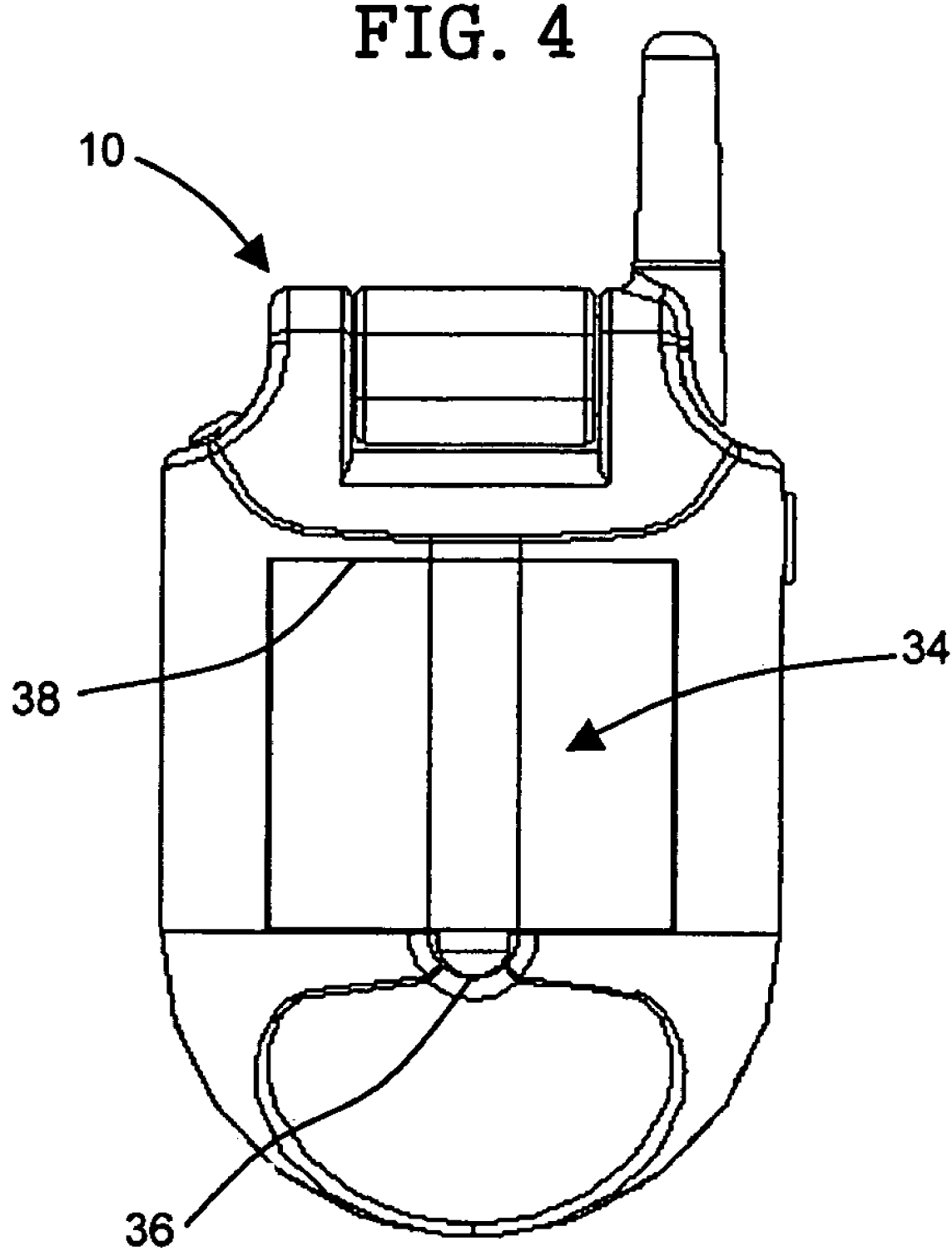
FIG. 4 illustrates a back view of the preferred embodiment shown in FIG. 1.

As shown best in FIG. 4, power supply 54 for device 10 is a bank of four AA Alkaline batteries. This bank of batteries is retained by battery door 34. Battery door 34 is retained by a battery door release 36 and a retained series of clips 38. The power supply 54 is separated into regulator array 52 that isolates the system power from the radio frequency device power and the LCD bias power. This is done to reduce noise cross over and to generate an LCD module 56 bias voltage that is negative with respect to the other power forms.

The data stream output from antenna 60 is formed by DSP 40 into sequential frames comprised of numerous packets. Each frame contains tags to insure secure communication is conducted between only device 10 units that are registered to a common list that is stored in flash memory 41 in DSP 40. Registration is done by device 10 units sharing entries in the common list. To communicate within any group of device 10 units, each common list maintained in a device 10 unit must contain the serial number of each of the other device 10 units that will communicate together. Each device 10 that is manufactured contains a serial number that is unique to each device 10 and can be viewed using the on-screen menu and will be printed on the back of the unit. This unique serial number is stored in flash memory 41 in DSP 40. In addition there is an optional name tag that is comprised of an ASCII text string that is input by a user into their device 10 and stored in flash memory 41 in DSP 40. The name tag text string is constructed using the on-screen menu displayed on LCD screen 16 and typically will be the name a user whishes to use to identify them self when their transmissions are received by other device 10 units. The serial numbers are added to a common list either manually by using the on-screen menu or by using a low-power automatic broadcast registration mode. In order to delete a common list entry removal must be done manually using the on-screen menu. For automatic broadcast registration, all units must be put in registration mode using the on-screen menu. Once in registration mode, the transmit power of the all device 10 units in that mode is drastically reduced to a limited range. All units in that mode monitor for transmissions of special registration frames containing the serial number tag, the name tag and a special command encoded into the frame packets. Each user in range then takes turns pressing their user button cap 30 which causes transmission of a registration frame. All units within range then place the serial number tag and name tag of the transmitting unit into the common list. As the common list is built, the entries are shown in text form on LCD screen 16.

Secure mode is optional and may be disabled by using the on-screen menu. When disabled, the common list is ignored and each frame's name tag is transmitted and received as a blank and the serial number is transmitted and received as a zero. In this way, device 10 units can communicate with all other device 10 units that have the security function disabled but cannot eavesdrop on other device 10 units that have their security mode enabled.

Device 10 operates on a number of different radio frequency channels. Channels are radio carrier frequencies that are spaced within the entire operating band and are out of the operating bandwidth such that transmission signals from a device 10 operating in one channel is not received by a device 10 operating in another. Device 10 operating channels are set by using the on-screen menu.

The software for device 10 can be stored in DSP 40 flash memory 41 along with JPEG pictures, tags and other configuration settings. This software can be loaded at the time of manufacture.

Figure 5:
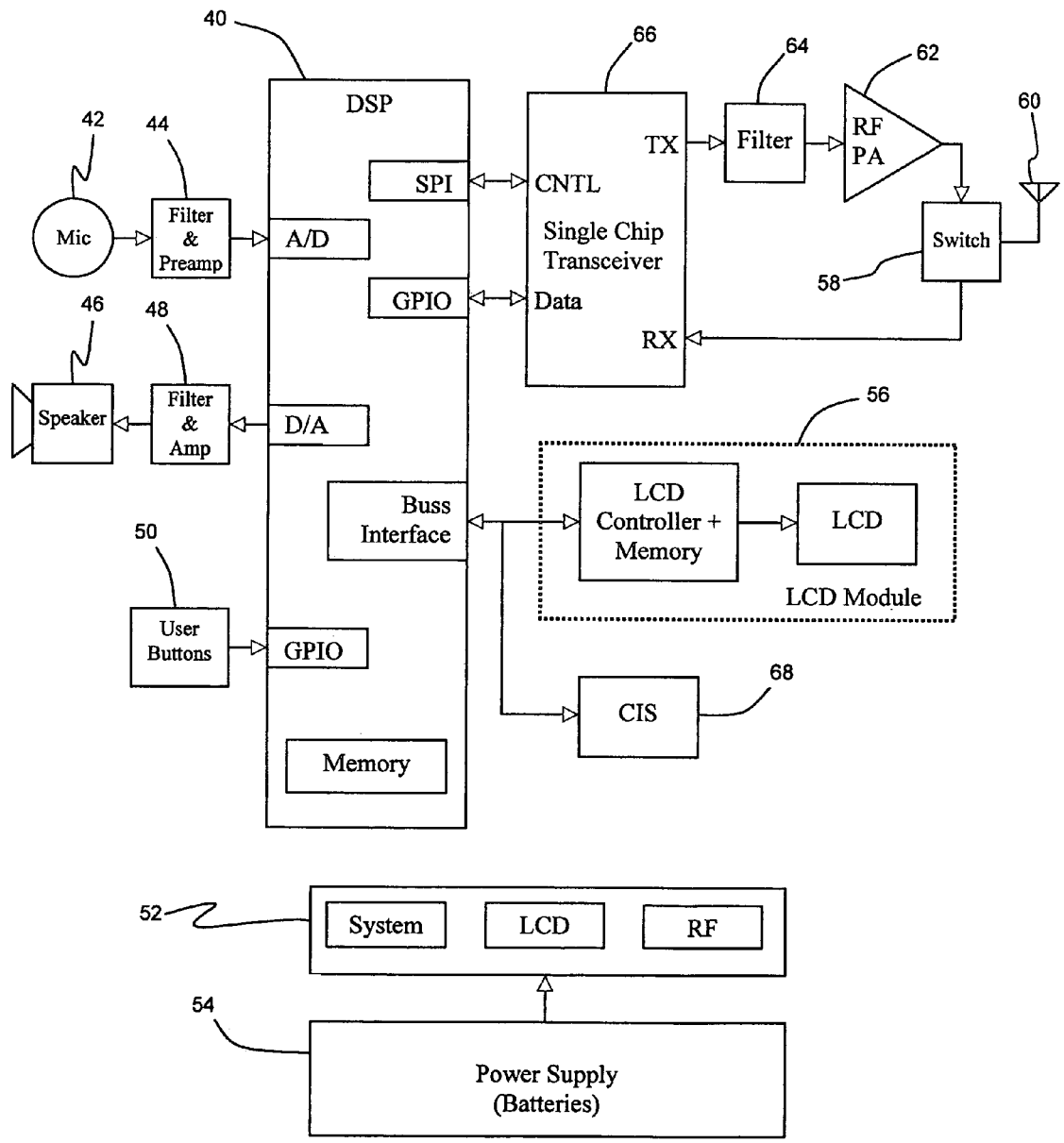
FIG. 5 illustrates a functional block diagram of the internal circuitry contained within the embodiment shown in FIG. 1.

As best shown in FIG. 5, is a functional block diagram of the internal circuitry contained within the embodiment shown in FIG. 1. DSP 40 receives input from antenna 60 when RF switch 58 allows. DSP 40 transmits data to antenna 60, in one embodiment, through transceiver 66, filter 64, and power amplifier 62. The received visual transmission interfaces through buss interface on DSP 40 and is displayed by LCD module 56, which consists of LCD screen 16, LCD controller and LCD memory. Additionally, CMOS image sensor 68 can collect visual transmission and send it directly to LCD module 56, without interacting with DSP 40. Input audio transmission is recorded from microphone 42 and in one embodiment pass through filter and preamp 44 before being converted through an analogue digital converter in DSP 40. Oppositely, audio transmission output to speaker 46 passes through an analogue-digital converter on DSP 40. User buttons 50 interact with DSP 40 for general purpose input/output ("GPIO") functionality. Power supply 54, which can be disposable or rechargeable batteries, provides power to device 10 through battery array 52, which keeps the device power separate from the system, RF transceiver 66 and LCD module 56.

Figure 6:
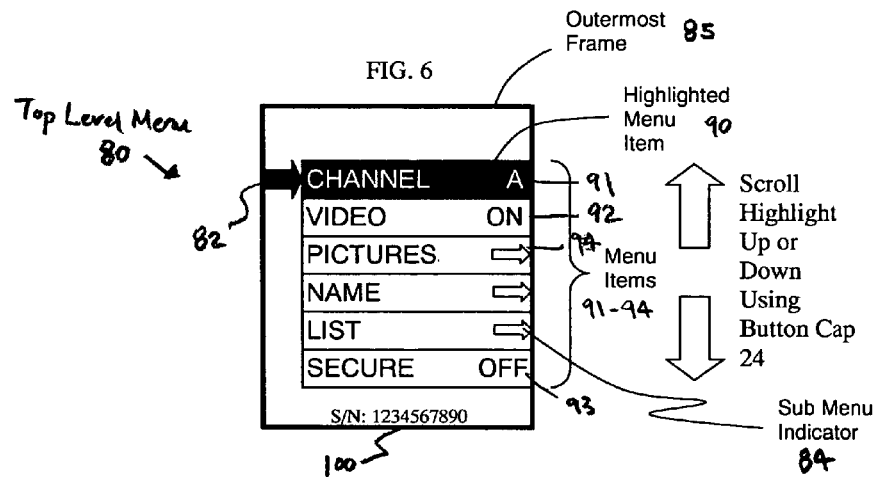
FIG. 6 illustrates a preferred embodiment of a top level menu of the user interface.

As best shown in FIG. 6, is top level menu 80 that is brought up after device 10 is powered. Pressing button cap 20 upon start-up will also bring up this top level menu 80 if it is not presently shown. Top menu 80 allows the user to choose from a select list of menu items 91-94 which represent various functions and modes for device 10. Outermost frame 85 represents the outer edge where LCD screen 16 meets the faceplate of device 10. Graphics and text within frame 85 are displayed as shown in the following figures.

One of menu items 91-94 will be selected by momentarily pressing button cap 26 or actuating button cap 24 right. Either of these actions will be referred to as selecting an item. Items to be selected are first highlighted by being displayed in an inverse color scheme with respect to other menu items. Highlighted menu item 90 is first highlighted before it can be selected. In addition, dark arrow 82 is shown to the left of highlighted menu item 90. Arrow 82 will always point to highlighted menu item 90. Actuating button cap 24 up or down will highlight the next menu item that is respectively up or down from the highlighted selection before the actuation is performed. Actuating button cap 24 up when highlighted menu item 90 is at the top-most item of any menu will cause no further action. Similarly, actuating button cap 24 down when highlighted menu item 90 is at the bottom-most menu item will also cause no further action. If a list of menu items does not fit on screen 16, scrolling will be possible. Factory-assigned serial number 100 is always displayed at the bottom center of top menu 80.

In one embodiment of the present invention, menu items 91-94 comprise channel item 91, video item 92, secure item 93, and pictures item 94. Items 91-94 are only displayed in top menu 80. Some items 91-94 will have deeper layers of menus associated with them that are indicated by the presence of submenu indicator arrows 84. Submenu indicator arrows 84 are shown on the right side of each menu item 91-94 when applicable. If no submenu is available, arrow 84 will not be present. Pressing button cap 20 will always return display screen 16 to the menu or submenu that has previously been shown. Selecting a menu item will advance screen 16 to the next possible submenu. When there are no further submenus stored in flash memory 41, pressing button cap 26 or actuating button cap 24 right will cause no further action. Similar to pressing button cap 20, actuating button cap 24 left will cause display screen 16 to return to the previous submenu or top menu 80. Either of these actions will be referred to as deselecting an item. When top menu 80 is displayed, deselecting an item 91-94 will cause no further action.

Figure 7:
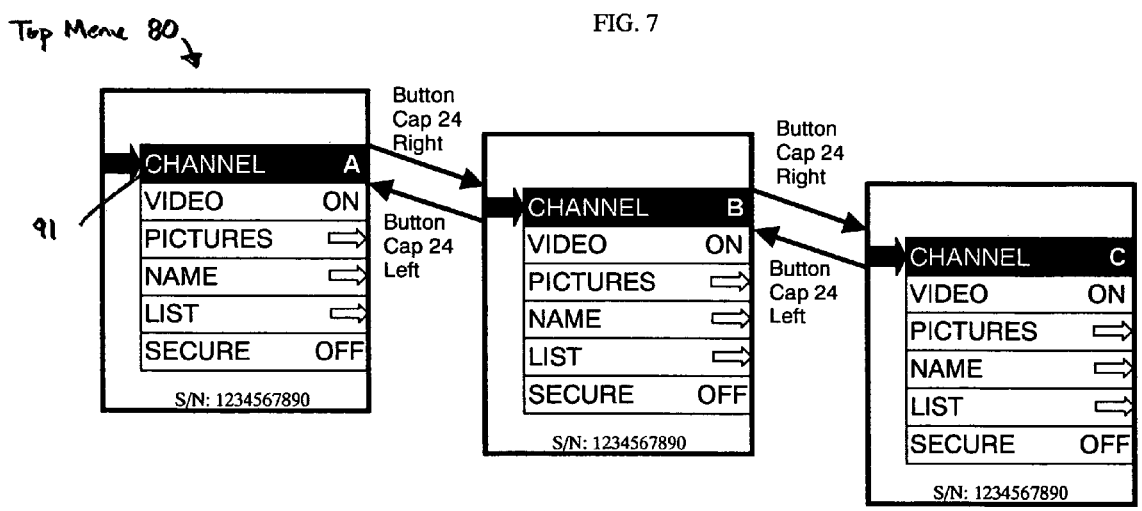
FIG. 7 illustrates a preferred embodiment of the best method of selecting RF channels.

Now referring to FIG. 7, top menu 80 is shown along with channel item 91 and the best method of selecting available RF channels. When channel item 91 is highlighted in top menu 80, actuating button cap 24 right will advance through available channels. Pushing button cap 24 left will regress to previous channels. When the desired available channel is highlighted, pressing button cap 26 will select that channel for use. Other top level menu items 92-94 will still be displayed as different channels are selected.

Figure 8:
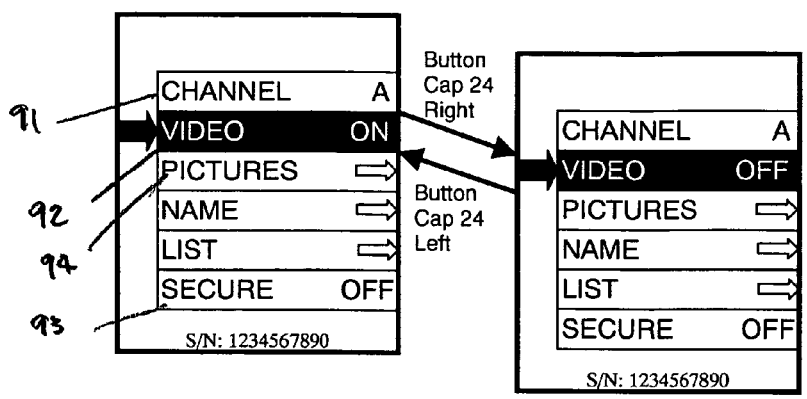
FIG. 8 illustrates a preferred embodiment of the best method of disabling or enabling video transmission.

Now referring to FIG. 8, top level menu 80 is shown along with video item 92 and the best method of enabling or disabling video transmission. When video item 92 is highlighted in top menu 80, actuating button cap 24 right will disable video transmission. Actuating button cap 24 left will enable video transmission. Other top level menu items 91, 93 and 94 will still be displayed as video is enabled or disabled.

Figure 9:
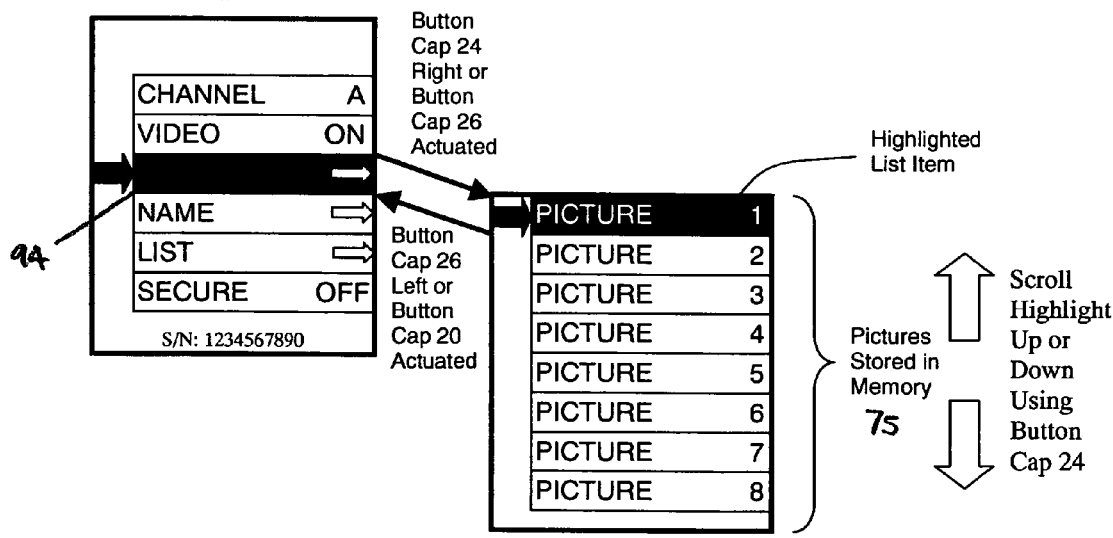
FIG. 9 illustrates a preferred embodiment of the best method of selecting still pictures.

Now referring to FIG. 9, top level menu 80 is shown along with pictures item 94, shown as a black box on the left of FIG. 9, and the best method of selecting available pictures. When picture item 94 is highlighted in top menu 80, actuating button cap 24 right will advance to a list of picture titles 75, shown on the right of FIG. 9, of all available pictures stored in memory 41. If no pictures are stored in memory 41, the text "NO PICTURES" will be displayed at the top of LCD screen 16. When a picture from list 75 has been selected, it may be deleted, displayed, renamed or transmitted to other devices 10, as shown in FIGS. 10-13. These possible actions are selected by scrolling up or down, using button cap 24, in the same manner that menu items 91-94 are selected.

Now referring to FIG. 10, picture list 75 is shown along with delete item 95, shown as a black box in the middle of FIG. 10, and the best method of deleting pictures. When delete item 95 is highlighted, actuating button cap 24 right will cause a confirmation box to appear, as shown on the right of FIG. 10. Selecting "YES" will delete the originally highlighted picture from memory 41 and revert screen 16 to picture list 75. Selecting "NO" will have no effect except to revert screen 16 to picture list 75.

Now referring to FIG. 11, picture list 75 is shown along with display item 96, shown as a black box in the middle of FIG. 11, and the best method of displaying pictures. When display item 96 is highlighted, actuating button cap 24 right will cause the selected picture to appear, as shown on the right of FIG. 11. Pressing any button while a picture is being displayed will revert screen 16 to picture list 75.

Figure 12:
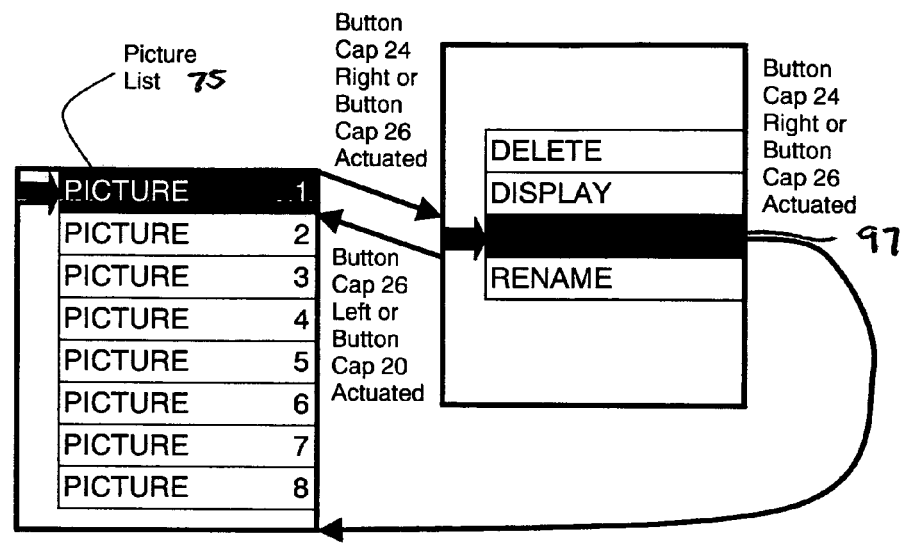
FIG. 12 illustrates a preferred embodiment of the best method of transmitting still pictures.

Now referring to FIG. 12, picture list 75 is shown along with send item 97, shown as a black box on the right of FIG. 12, and the best method of transmitting pictures to another device 10. When send item 97 is highlighted, actuating button cap 24 right or button cap 26 will transmit the originally highlighted picture to other devices 10 that are within range and listed in the universal common list 120. Pictures that are transmitted to another device 10 retain the name that was assigned in the transmitting device 10.

Figure 13:
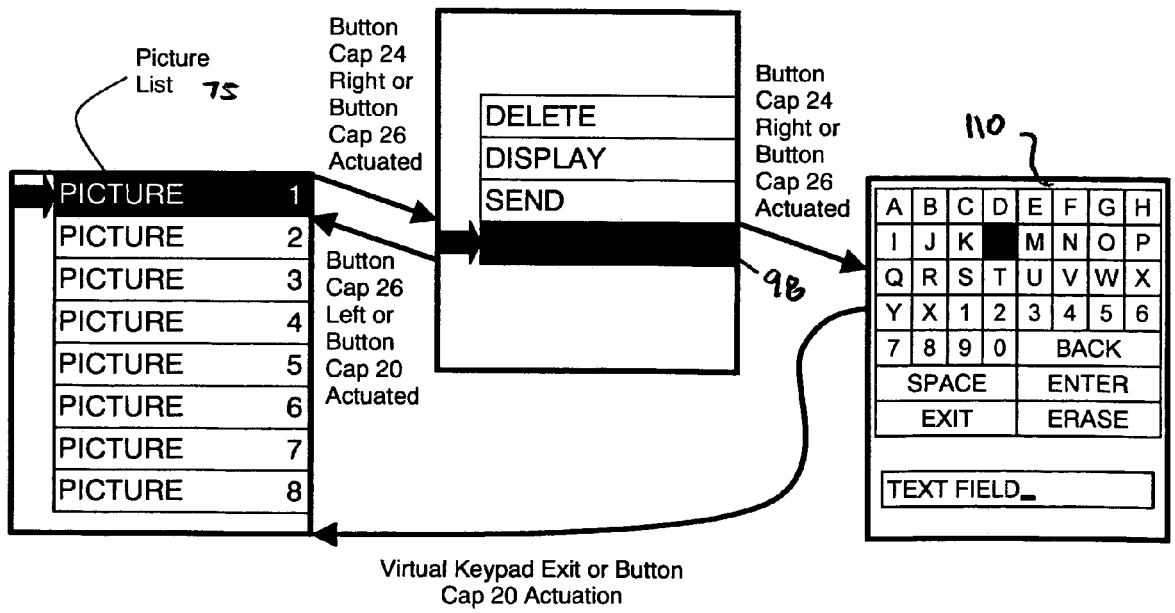
FIG. 13 illustrates a preferred embodiment of the best method of renaming still pictures.

Now referring to FIG. 13, picture list 75 is shown along with rename item 98, shown as a black box in the middle of FIG. 13, and the best method of renaming pictures. Pictures that have not been manually named are assigned a name by device 10 and stored in flash memory 41 with the title as "picture" followed by a numeral. The numeral indicates the order in time in which the particular picture had been stored in flash memory 41. Pictures with names assigned by device 10 are automatically renumbered if a picture is deleted so that the number sequence is always contiguous starting from number one. When rename item 98 is highlighted, actuating button cap 24 right will cause virtual keypad 110 to be displayed, as shown on the right of FIG. 13. Pictures are renamed using keypad 110. After a new name is assigned, keypad 110 can be exited by pressing a virtual exit button located on the keypad or by actuating button cap 20, either of which will return screen 16 to picture list 75.

Figure 14:
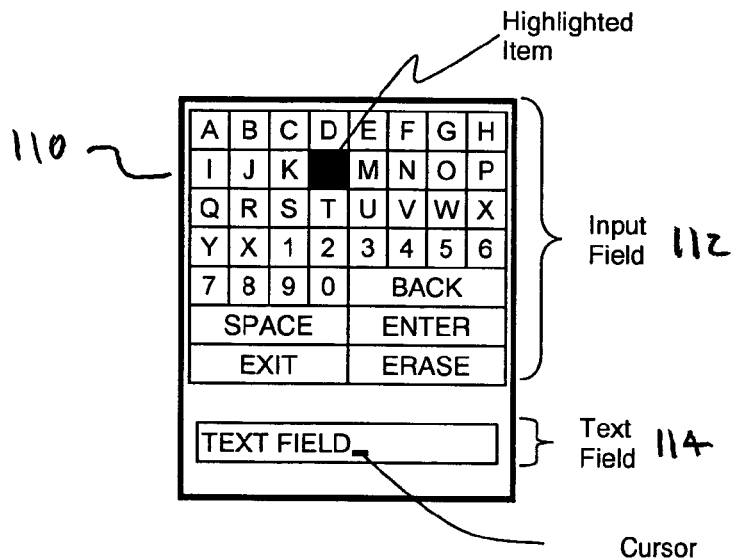
FIG. 14 illustrates a preferred embodiment of the virtual keypad.

As best shown in FIG. 14 is virtual keypad 110 that can be called by some menu items 91-99. Keypad 110 is divided into two distinct fields; input field 112 and text field 114. One field will always be highlighted when keypad 110 is called and displayed. Boxes containing letters, numbers and symbols comprising punctuation marks and editing commands, such as erase, backspace, and enter, in the input field are highlighted one at a time. The highlighted cursor is maneuvered over the grid of boxes in the up, down, right, and left directions by respectively actuating button cap 24 in the same direction. Text field 114 shows the name of the menu item that called keypad 110 when it is first shown. Text field 114 can be modified by highlighting boxes in input field 112, in the manner described above, and selecting an enter button on keypad 110 or actuating button cap 26. Again, keypad 110 can be exited by highlighting "EXIT" or actuating button cap 20.

Figure 15:
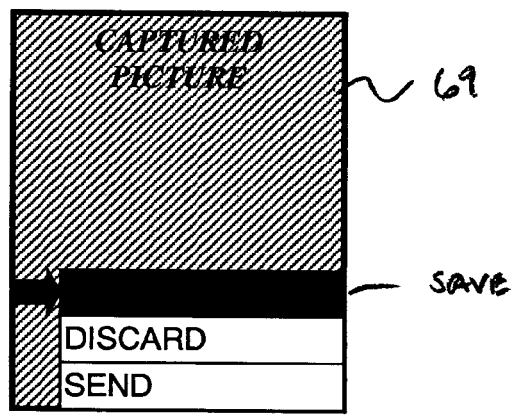
FIG. 15 illustrates a preferred embodiment of the best method of displaying options after capturing still pictures.

In one embodiment of the present invention, while device 10 is not displaying any menu, actuating button cap 32 will cause a still picture to be captured from the visual field of CMOS image sensor 68. The picture will be stored in DSP flash memory 41 and will override any video reception and be persistently displayed on screen 16. Now referring to FIG. 15, shown is superimposed menu 69. The highlights for menu 69 are selected using button cap 24 in the same manner as other menu items 91-99. Storing or discarding the captured picture to DSP 40 flash memory 41 is accomplished by highlighting "SAVE" or "DISCARD". After saving or discarding the captured picture, screen 16 will revert to display the menu that was displayed immediately before menu 69. The captured picture can also be immediately sent to other devices 10 in range that share the same common list using send item 97. If the allocated flash memory 41 is full, older pictures can be overwritten.

Figure 16:
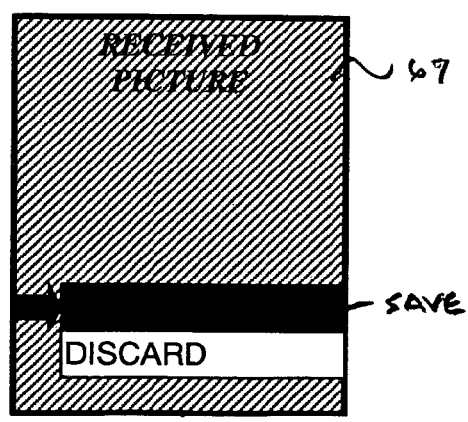
FIG. 16 illustrates a preferred embodiment of the best method of displaying options after receiving a still picture.

In one embodiment of the present invention, while device 10 is not displaying any menu, it may receive a picture from another device 10. The picture will be stored in DSP 40 flash memory 41 and override any video reception and be persistently displayed on screen 16. Now referring to FIG. 16, shown is superimposed menu item 67. The highlights for menu 67 are selected using button cap 24 in the same manner as other menu items 91-99. Storing or discarding the received picture to DSP 40 flash memory 41 is accomplished by highlighting "SAVE" or "DISCARD". After saving or discarding the captured picture, screen 16 will revert to display the menu that was displayed immediately before menu 67. If the allocated memory 41 is full, older pictures can be overwritten.

Figure 17:
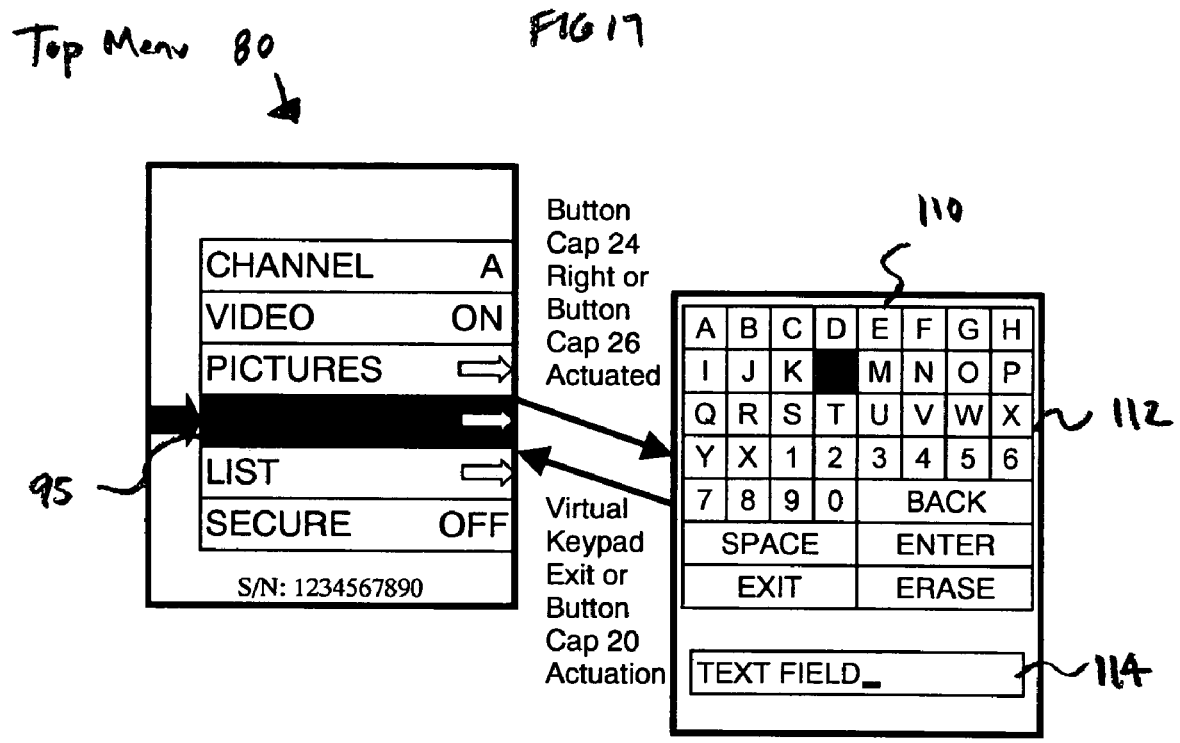
FIG. 17 illustrates a preferred embodiment of the best method of displaying and modifying the names of other devices within range.

Now referring to FIG. 17, top level menu 80 is shown along with the name item 95 and the best method of displaying and modifying the names of other devices 10 within range. When the name menu item is highlighted, actuating button cap 24 right or button cap 26 will display keypad 110. Text field 114 contains any previously assigned name of the device 10 or if none has been assigned, the serial number of the device 10. A new name can be assigned using input field 112 on keypad 110.

Figure 18:
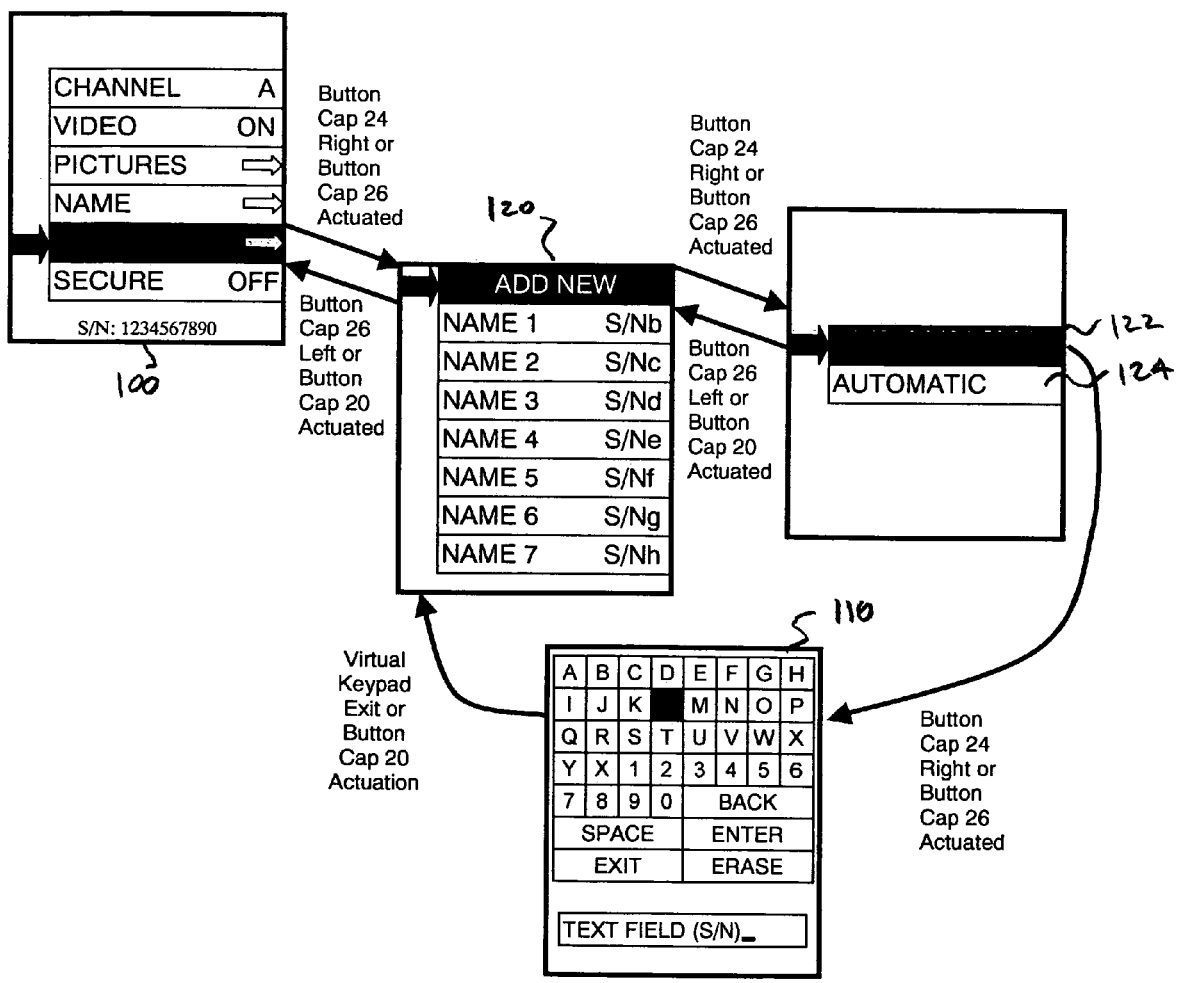
FIG. 18 illustrates a preferred embodiment of the common list and best method of manually entering names.

As best shown in FIG. 18 is top level menu 80 along with common list 120 and the best method of displaying available names of devices and manually entering names. When "NAME" is highlighted on top level menu 80, actuating button cap 24 right or button cap 26 will display the common list 120. The first entry on common list 120 is always "ADD NEW," shown as a black box in the middle of FIG. 19. When "ADD NEW" is highlighted, actuating button cap 24 right or button cap 26 displays a second menu, shown on the right of FIG. 18 and comprises manual item 122 and automatic item 124. When manual item 122 is highlighted, actuating button cap 24 right or button cap 26 will call and display keypad 110. A new name can be entered manually using keypad 110. Names can also be deleted from common list 120 in a similar manner as pictures are deleted. If no devices are within range and no names have been previously entered, then the text "NO ENTRIES" will be displayed below "ADD NEW". Available names in common list 120 are arranged by serial number 100.

Figure 19:
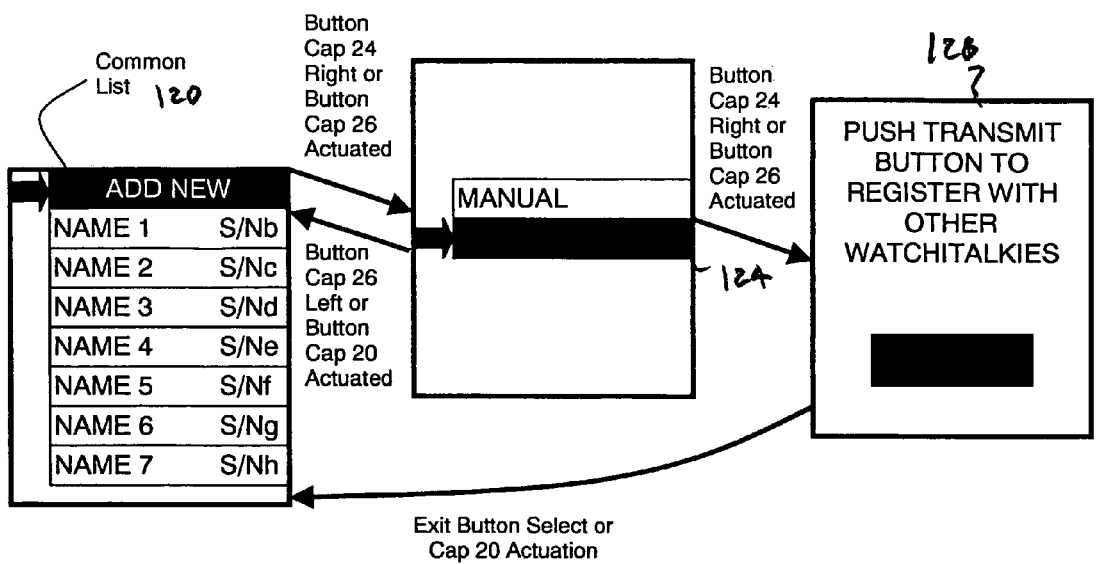
FIG. 19 illustrates a preferred embodiment of the common list and the best method of automatically entering names.

As best shown in FIG. 19 is common list 120 along with automatic item 124 and the best method for displaying available names of devices and automatically entering names. When automatic item 124 is highlighted, actuating button cap 24 right or button cap 26 will display instruction screen 128 containing instructions to push transmit button 30 to register with other devices 10. Other devices in registration mode will receive the name and serial number 100 of the transmitting device 10 and automatically append common list 120. Registration of devices 10 with each other can not occur simultaneously. While transmitting, any reception of registration data will be disabled. When registration information is received by device 10 in automatic registration mode, a 1 KHz. tone is transmitted over speaker 46 for a duration of 500 milliseconds after the name and serial number 100 of transmitting device 10 has been added to common list 120.

Figure 20:
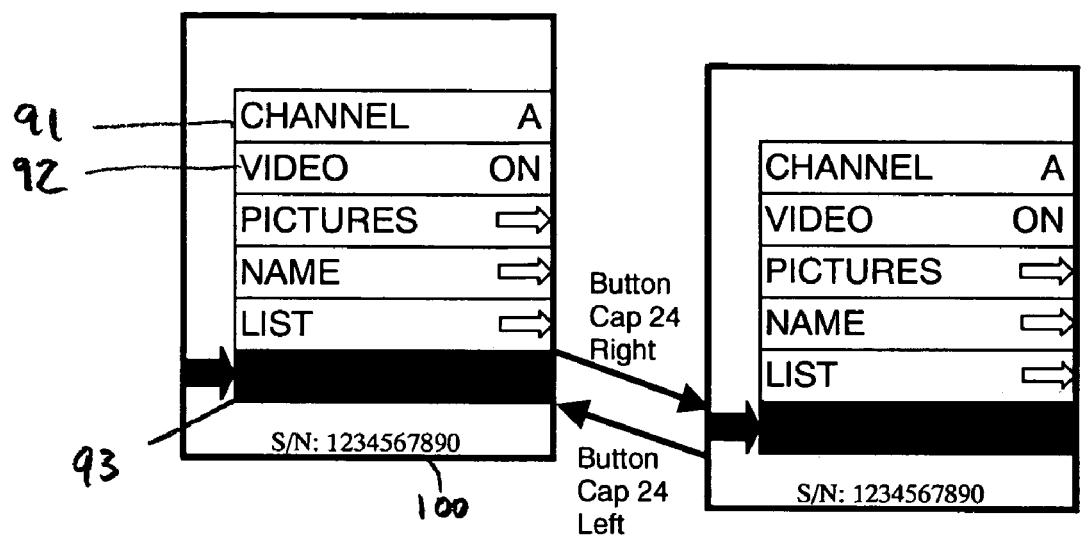
FIG. 20 illustrates a preferred embodiment of the best method of enabling or disabling secure communication.

Now referring to FIG. 20, top level menu 80 is shown along with secure item 93, shown as a black box, and the best method of enabling or disabling secure communication between registered devices 10. When secure item 93 is highlighted in top menu 80, pushing button cap 24 right will disable secure communication. Pushing button cap 24 left will enable secure communication. Other exemplary top level menu items 91 and 92 will still be displayed as security is enabled or disabled.

The present invention includes any novel feature or combination of features disclosed herein either explicitly or any generalization thereof. While the invention has been described with respect to specific examples including presently preferred modes of carrying out the invention, those skilled in the art will appreciate that there are numerous variations and permutations of the above described apparatus and techniques. Thus, the spirit and scope of the invention should be construed broadly as set forth in the appended claims.

What is claimed is:

1. A first secure audio-visual communication device comprising:
   a device housing;
   a radio-frequency transceiver configured for sending a broadcasted audio data transmission simultaneously and in conjunction with a broadcasted visual data transmission;
   an antenna electronically coupled to the transceiver;
   a digital signal processor interfaced with the antenna through the transceiver and configured for storing a memory;
   a LCD module having an integrated memory and coupled to the transceiver for outputting visual data;
   an image sensor coupled to the LCD module and the transceiver for inputting visual data, and wherein the image sensor is pivotally engaged with the device housing;
   a speaker coupled to the transceiver for outputting audio data;
   a microphone coupled to the transceiver for inputting audio data; and
   a pre-amplifier configured such that a signal transmitted from the microphone is filtered and amplified by the pre-amplifier before reaching the digital signal processor; whereby the secure audio-visual communication device is a first wireless communication device and is configured for operating in a "secure" mode, wherein the transmissions broadcasted by the first wireless communication device are directly received in real time only by the at least a second and a third other secure audio-visual communication device within range that have each been pre-approved to receive said transmissions by registering said the second and the third other secure audio-visual communication device by adding a serial number associated with each of the second and the third other secure audio-visual communication device to a common list contained within the first wireless communication device, and wherein the transmissions broadcasted by the at least the second secure audio-visual communication device and the third secure audio-visual communication device within range are directly received in real time only by the first wireless communication device that have been pre-approved to receive said transmissions by registering each of the second secure audio-visual communication device and the third secure audio-visual communication device by adding their respective serial numbers to the common list contained within the first wireless communication device, whereby communications can proceed by at least one of a first case where the first, second and third secure audio-visual communication device are in communication with each other, and a second case where the one of the first, second, and third secure audio-visual communication device can be in communication with the other two of the first, second and third secure audio-visual communication devices which are not in communication with each other.

2. A method for using a secure audio-visual communication device comprising the steps of:

pressing and releasing a first button of a first wireless communication device to change the first device from an off state to an on state;

registering the first device with at least a second wireless communication device within range by adding a serial number of the second device to a common list contained within the first device as a prerequisite to enabling communications from the first wireless communication device and the at least a second wireless communication device;

selecting a radio-frequency channel from a menu on the first device;

actuating a second button of the first device and transmitting a first audio signal to the second devices while simultaneously: (a) pointing an image sensor of the first device toward a viewing target, (b) capturing a first visual signal from the viewing target, and (c) storing and transmitting the visual signal to the second device;

de-actuating the second button of the first device to switch the first device from a transmit mode to a receive mode; and waiting to simultaneously receive a second audio signal and second visual signal from the second device;

whereby, the first signal is transmitted via radio waves broadcasted in real time by the first device and directly received the second device;

selecting a second radio-frequency channel from the menu of the first device to communicate with at least a third wireless communication device, and generating, transmitting and receiving a registration frame by the first wireless communication device, the at least a second wireless communication device, and the at least a third wireless communication device, reducing transmit power in the first wireless communication device, at least a second wireless communication device, and at least a third wireless communication device based upon the reception of the registration frame, whereby communications can proceed at minimum power by at least one of a first case where three of the devices can be in selectable communication together and a second case where one of the devices can be in communication with the other two devices which are not in communication with each other.

* * * * *

UNITED STATES PATENT AND TRADEMARK OFFICE
CERTIFICATE OF CORRECTION

| | | |
|---|---|---|
| PATENT NO. | : 7,676,246 B2 | Page 1 of 1 |
| APPLICATION NO. | : 11/406960 | |
| DATED | : March 9, 2010 | |
| INVENTOR(S) | : Marcus Krieter | |

It is certified that error appears in the above-identified patent and that said Letters Patent is hereby corrected as shown below:

Title Page, Item (76) Inventor: and Item (12)

Delete "Kreiter" and insert --Krieter--.

Signed and Sealed this
Nineteenth Day of April, 2011

David J. Kappos
*Director of the United States Patent and Trademark Office*